United States Patent [19]

Biale

[11] Patent Number: 4,457,969

[45] Date of Patent: Jul. 3, 1984

[54] FIRE-RESISTANT, LIGHT STABLE TEXTILE STRUCTURE

[75] Inventor: John Biale, Placentia, Calif.

[73] Assignee: Union Oil Company of California, Los Angeles, Calif.

[21] Appl. No.: 486,032

[22] Filed: Apr. 18, 1983

Related U.S. Application Data

[63] Continuation-in-part of Ser. No. 450,192, Dec. 16, 1982.

[51] Int. Cl.³ .............................................. D04H 1/58
[52] U.S. Cl. .................................... 428/288; 428/290; 428/297; 428/426; 428/442; 428/443; 428/510; 428/532; 428/920; 428/921
[58] Field of Search .............. 428/288, 290, 297, 443, 428/920, 921, 426, 442, 510, 532

[56] References Cited

U.S. PATENT DOCUMENTS

| | | | |
|---|---|---|---|
| 3,004,008 | 10/1961 | Carpenter | 260/85.5 |
| 3,423,484 | 1/1969 | Allison | 260/901 |
| 3,424,706 | 1/1969 | Smith et al. | 260/29.6 |
| 3,696,082 | 10/1972 | Smith et al. | 260/80.8 |
| 3,922,451 | 11/1975 | Anschutz et al. | 428/35 |
| 3,974,130 | 10/1976 | Hurm et al. | 526/330 |
| 4,374,894 | 2/1983 | Antlfinger | 428/290 |

FOREIGN PATENT DOCUMENTS 2003489 3/1979 United Kingdom .

*Primary Examiner*—James J. Bell
*Attorney, Agent, or Firm*—Dean Sandford; Greg Wirzbicki; Robert Baran

[57] ABSTRACT

The invention is a fire-resistant, light stable textile structure comprising a mat of fibers held together with a vinylidene chloride interpolymer, containing a light-stabilizing amount of a nitrile-containing comonomer in interpolymerized form.

23 Claims, No Drawings

FIRE-RESISTANT, LIGHT STABLE TEXTILE STRUCTURE

CROSS REFERENCE TO RELATED APPLICATIONS

This patent application is a continuation-in-part of copending U.S. patent application Ser. No. 450,192, entitled "A Light-Stabilized Copolymer" and filed on Dec. 16, 1982 in the name of John Biale.

BACKGROUND OF THE INVENTION

1. Field of the Invention

This invention relates to the stabilization of vinylidene chloride interpolymers against light-induced degradation. More particularly, this invention is related to the stabilization of fire-resistant non-woven fabrics, including an interpolymer of vinylidene chloride and a mat of fibers, against actinic degradation and discoloration, i.e. yellowing.

2. Description of the Art

The fire resistance of certain polymers is directly related to the amount of chlorine contained therein; therefore, interpolymers containing a high amount of vinylchloride, in interpolymerized form, are used in applications requiring fire resistance. For example, fire-resistant coatings are formulated with vinylchloride interpolymers, wherein the amount of vinylchloride comonomer comprises at least about 50 percent, by weight, in interpolymerized form.

Vinylidene chloride contains almost 30 percent, by weight, more chlorine than vinyl chloride on an equivalent molar basis; therefore it is desirable to utilize vinylidene-chloride interpolymers in fire-resistant formulations. Unfortunately, when exposed to sunlight or ultraviolet radiation, vinylidene chloride interpolymers become brittle, discolor, crack, and lose tensile strength. In addition, about 5 percent of the total weight of powders of polyvinylidene chloride is evolved as hydrochloric acid upon exposure to ultraviolet radiation—all of which severely limits the utility of this material.

Commercial suppliers of polymeric materials have approached the problem of light-induced degradation of polymeric materials by the addition of compounds called "ultraviolet absorbers" which prevent ultraviolet radiation from penetrating the material. The most commercially significant class of ultraviolet absorbers are derivatives of 2-hydroxybenzophenone, phenyl esters, and cinnamic acid derivatives.

Another approach to the inhibition or prevention of light-induced degradation of interpolymers of vinylidene chloride has been by the addition of compounds referred to as "excited state quenchers." When interpolymers of vinylidene chloride are exposed to actinic energy, they are excited to levels of greater energy. Excited state quenchers interact with these energetically excited interpolymers so as to lower their excitation energy thereby avoiding or lessening degradation of the interpolymers. Useful excited state quenchers are 1,3 cyclooctadiene, 2(2'-hydroxy-5'-methylphenylbenzotriazol), and 2-hydroxy-4-methoxybenzophenone.

Unfortunately, even generally excellent stabilizing compounds are not entirely free of disadvantage; for example, only a limited amount of stabilizer can be added to inhibit or prevent light-induced degradation since above a low concentration of stabilizer there often is no proportional increase in protective activity as concentration increases. In addition, at high concentrations some stabilizers may even increase degradation and often increased levels of ultraviolet stabilizers have a deleterious effect on the desired physical and chemical properties of the polymeric materials to be stabilized. Further still, stabilizing compounds, being of low molecular weight in comparison to the polymer molecules to be stabilized, are often removed from the polymeric material through exudation, volatilization, leaching, or other processes, thereby reducing the effective life of the stabilizer in the polymeric material and increasing the possibility of unwanted volatilization of toxic chemical species.

The need remains to inhibit or prevent the light-induced degradation of polymeric materials derived from vinylidene chloride. The satisfaction of this need would preferably preserve or enhance the mechanical properties of the interpolymers of vinylidene chloride while not adding a toxic substance which may exude, volatilize, or be leached out of the material during use. Moreover, coatings that yellow when exposed to sunlight have limited decorative use.

Many comonomers have been interpolymerized with vinylidene chloride to modify the nature thereof. For example, in U.S. Pat. No. 3,922,451, it is taught that adhesion promoting comonomers such as vinylcarboxylic acids, vinylcarboxylic acid amides, and hydroxy containing vinyl monomers may be interpolymerized with vinylidene chloride to provide latexes useful as beverage container coatings. The latexes may include conventional thickeners, surfactants and wetting agents, but are essentially free from any solids other than the interpolymer. Moreover, it is disclosed that other comonomers may be present in the vinylidene chloride interpolymer including acrylonitrile, methacrylonitrile, alkylacrylates, alkacrylates, vinylmonomers, etc. The other comonomers are likely included to disrupt the crystallinity of the vinylidene chloride (although the reason for the inclusion of such other comonomers is not specifically set forth) and thereby provide interpolymers which are film-forming at the temperature used in beverage container coating. It is clear, however, that the patentees are not concerned with light-induced degradation or discoloration of the vinylidene chloride interpolymers of the patent since the coatings are applied to the interior of the beverage container.

In view of the foregoing, one object of this invention is to inhibit or prevent light-induced degradation of the interpolymers of vinylidene chloride.

Another object of this invention is to provide fire-resistant, light-stable non-woven fabrics including a vinylidene chloride interpolymer as a bonding material.

These and other objects and advantages of the invention will become apparent in view of the following description of the invention.

SUMMARY OF THE INVENTION

It has unexpectedly been discovered that the interpolymerization of a minor amount of a nitrile-containing comonomer with a major amount of vinylidene chloride provides an interpolymer having improved stability to actinic radiation, and such interpolymers may be utilized to provide fire-resistant non-woven fabric.

The interpolymer may also comprise a minor amount of a plasticizing comonomer to enhance the film-forming properties thereof. The non-woven fabrics of this invention include a mat or web of fibers bonded with the vinylidene chloride interpolymer. The non-woven fabrics of this invention may be utilized as fire-resistant backings for vinyl upholstery, rrugs, vinyl fabrics, wall coverings as well as furnace filters, etc.

DETAILED DESCRIPTION OF THE INVENTION

The invention provides a fire-resistant, light stable non-woven fabric which comprises a mat of fibers held together with a vinylidene chloride interpolymer, containing a light-stabilizing amount of a nitrile-containing comonomer in interpolymerized form. The vinylidene chloride interpolymer may comprise, on a comonomer weight basis:

(a) from about 50 to about 90 percent vinylidene chloride;
(b) from about 5 to about 30 percent of a plasticizing comonomer for vinylidene chloride selected from the group consisting of butadiene, maleic anhydride, and compounds represented by the general formula:

$R_1-X$ and

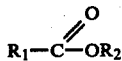

wherein $R_1$ is an organic radical containing an alpha unsaturated alkyl group having from 2 to about 30 carbon atoms, $R_2$ is hydrogen or an alkyl, alkoxyalkyl, hydroxyalkyl, or aminoalkyl radical having from 1 to about 20 carbon atoms, and X is a phenyl group, acetate group, ethoxy group, a halide or hydrogen; and (c) from about 3 to about 15 percent of a nitrile-containing comonomer selected from the group consisting of compounds represented by the general formula:

$R_3-CN$ wherein $R_3$ is an organic radical containing an alpha unsaturated alkyl group having from 2 to about 20 carbon atoms.

The plasticizing comonomer is utilized to disrupt the crystallinity of the vinylidene chloride and enable film formation at about ambient temperature. Therefore, although the plasticizing comonomer may not be a 'soft' monomer in and of itself (e.g. styrene forms a very rigid homopolymer), by disrupting the crystallinity of the vinylidene chloride, the plasticizing comonomer functions to aid film formation.

Suitable plasticizing comonomers are styrene, vinyl chloride, vinyl acetate, ethylene, butadiene, ethyl vinyl ether, maleic anhydride, and compounds having the structural formula:

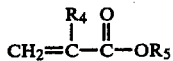

wherein $R_4$ is hydrogen or a lower alkyl group having up to 4 carbon atoms, e.g., a methyl group or a butyl group, and $R_5$ is hydrogen or an alkyl, alkoxyalkyl, hydroxyalkyl, or aminoalkyl radical having from 1 to 20 carbon atoms. The preferred plasticizing comonomers for use in this invention are the lower alkyl esters of acrylic acid and methacrylic acid, where the alkyl group comprises from 1 to 4 carbon atoms, e.g. methyl acrylate, n-butyl acrylate, methyl methacrylate, n-butyl-methacrylate, etc.

The nitrile-containing comonomer for use in this invention has the structural formula:

$R_4-CN$ wherein $R_4$ is an organic radical containing an alpha unsaturated alkyl group having from 2 to 10 carbon atoms or an alpha unsaturated styryl group having from 8 to 20 carbon atoms. The alpha unsaturated styryl group has the following structure:

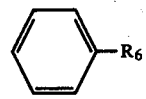

wherein $R_6$ is an alpha unsaturated alkyl group having from 2 to 14 carbon atoms and the nitrile group is substituted at any point available on the benzene ring. Preferably, $R_6$ is a hydrocarbyl radical consisting essentially of hydrogen and carbon and is selected from the group consisting of radicals represented by the general formula:

wherein $R_7$ is hydrogen or a lower alkyl radical containing up to 4 carbon atoms, e.g., a methyl radical. The most preferred nitrile-containing comonomer is acrylonitrile.

The relative amounts and identity of the above comonomers will be selected to contribute to the desired end-use properties of the non-woven fabrics. For example, higher concentrations of vinylidene chloride will provide a stiffer interpolymer and therefore a stiffer non-woven fabric. The fire resistance of the non-woven fabric will increase with both the amount of vinylidene chloride interpolymer utilized to bond the mat of fibers and the concentration of vinylidene chloride in the interpolymer. The stiffer webs are especially useful in filtering applications, as fiber fill, etc.

On the other hand, certain applications require a non-woven fabric having a soft hand. One approach to obtaining a soft hand is to utilize a vinylidene chloride interpolymer having a relatively lower concentration of vinylidene chloride comonomer and a relatively higher concentration of plasticizing comonomer, i.e., a softer interpolymer. The fire-resistance of such softer interpolymers is commensurately decreased; therefore, a preferred approach to achieving a non-woven fabric having a soft hand is to bond the mat of fibers with a vinylidene chloride interpolymer having a higher concentration of vinylidene chloride comonomer, but that has been softened with a non-volatile, fire-resistant plasticizer such as an organophosphate ester or the equivalent. The softer non-woven fabrics of this invention are useful in textile applications as backings for clothing, upholstery, etc.

The preferred and most preferred proportions of comonomers in the interpolymers for use in preparing the composites of this invention are set forth in Table I below.

TABLE I

| Percent of Total Weight Derived from | Interpolymer Compositions | | |
|---|---|---|---|
| | Vinylidene Chloride | Acrylontrile | Lower Alkyl Ester of Acrylic Acid or Methacrylic Acid |
| Preferred | 70 to 90 | 3 to 10 | 5 to 20 |
| Most Preferred | 70 to 80 | 5 to 10 | 10 to 20 |

The vinylidene chloride interpolymers useful in this invention are usually prepared by polymerization techniques such as suspension polymerization and emulsion polymerization. Suspension polymerization refers to polymerization in an aqueous system with the monomer in a dispersed phase. Typically, a free radical-forming material called an initiator is dissolved in the monomer-containing phase. Suspension polymerization is used commercially for the preparation of vinylidene chloride polymers useful as molding and extrusion resins. The principle advantage of the suspension process over the emulsion process is the use of fewer ingredients that can detract from polymer properties. Additionally, stability is improved and water sensitivity is decreased.

The reaction ingredients used to produce a specific interpolymer comprising vinylidene chloride, methyl acrylate, and acrylonitrile by suspension polymerization are given in Table II. At a reaction temperature of 60° C. the polymerization proceeds to 85 to 90 percent conversion in 30 to 60 hours. Unreacted monomer is removed by vacuum pumps, condensed, and reused after processing. The polymer is obtained in the form of small (30 to 100 mesh) beads that are dewatered by a centrifuge and then dried in a flash dryer or fluidized-bed dryer.

TABLE II

| Typical Suspension Polymerization Reaction Mixture | |
|---|---|
| | Parts by Weight |
| Vinylidene chloride | 70 |
| Methyl acrylate | 20 |
| Acrylonitrile | 10 |
| Deionized water | 200 |
| (Methyl) (hydroxypropyl)-cellulose, (400 centipoise) | 0.05 |
| Lauryl peroxide (initiator) | 0.3 |

It is important that the initiator be uniformly dissolved in the monomer prior to droplet formation. Protective colloids used to prevent droplet coalescense and control particle size are poly(vinyl alcohol), gelatin, and methyl cellulose. Organic peroxides, percarbonates, and azo compounds are used as initiators for vinylidene chloride suspension polymerization.

Emulsion polymerization, which is a widely used technique, differs from suspension polymerization in two important respects: The initiator is located in the aqueous phase and the polymer particles produced are typically on the order of less than 1 mm in diameter, some ten times smaller than the smallest encountered in suspension or "dispersion" polymerization. Emulsion polymerization is used to prepare interpolymers of vinylidene chloride for which there are two general applications. In some applications, the latex which results is used directly; in others, the interpolymer is first isolated from the latex as a dry powder before use.

The principal advantages of emulsion polymerization as a method for preparing vinylidene chloride interpolymers are:

(a) high-molecular-weight polymers can be produced in reasonable reaction times. The initiation and propagation steps can be more readily controlled.
(b) monomers can be added during the polymerization to maintain copolymer composition control.

The reaction ingredients used to produce a specific interpolymer comprising vinylidene chloride, butyl acrylate, and acrylonitrile by emulsion polymerization are given in Table III.

TABLE III

| Typical Batch Emulsion Polymerization Reaction Mixture | |
|---|---|
| | Parts by Weight |
| Vinylidene chloride | 70 |
| Butyl acrylate | 20 |
| Acrylonitrile | 10 |
| Water | 180 |
| Potassium persulfate | 0.22 |
| Sodium bisulfite | 0.11 |
| Dihexyl sodium sulfosuccinate, 80% (surfactant) | 3.58 |
| Nitric acid, 60% | 0.07 |

As noted in the foregoing Table III, dihexyl sodium sulfosuccinate is added as a surfactant to aid in the dispersion of the monomers. In large scale production, surfactants are generally anionic, but in some cases a combination of anionic and nonionic surfactants are employed. Free radical sources other than persulfates may be used, such as hydrogen peroxide, organic hydroperoxides, perborates, and percarbonates. Many of these are added in redox pairs where an activator promotes the decomposition of the peroxy compound. Examples are persulfate or perchlorate activated with bisulfite, hydrogen peroxide with metallic ions, and organic hydroperoxides with sodium formaldehyde sulfoxylate. The use of an activator causes the decomposition of initiator to occur at a lower reaction temperature, which allows the preparation of higher-molecular-weight polymers within reasonable reaction time.

One particularly useful emulsion polymerization techique which results in the preparation of a polydisperse polyvinylidene chloride latex is the copolymerization in the presence of a preformed seed latex. According to this method a preformed latex particle (seed latex) is prepared from monomers containing at least one methylene group attached to a carbon atom by a double bond which undergoes additional polymerization in aqueous dispersion to form high molecular weight linear polymers. The polymerization can be carried out batchwise, except for the addition of the seed latex, or it can be accomplished by continuous addition of one or more additional components employed in polymerization. In its simplest form, the entire charge of monomers is emulsified, initiating the polymerization reaction and subsequently adding seed latex to the polymerization zone, either continuously or periodically at predetermined intervals and predetermined amounts. An advantage of the gradual addition of monomers (either continuous or periodic) lies in reaching a high solids content with optimum control of reaction conditions.

A convenient method of carrying out the polydisperse vinylidene chloride polymerization from a seed latex comprises preparing separate premixtures as follows:

1. An emulsifier-monomer premixture containing from about 50 percent to 90 percent of the weight of the seed latex to be employed (at least 0.5 parts by weight per 100 parts by weight of the total of monomer and seed latex); and 2. a seed-latex premixture containing from 10 percent to 50 percent of the weight of the seed latex to be used and the free radical catalyst. In this method of operation, the seed-latex premixture (containing free-radical catalyst) is first added to the reactor vessel with from about 1% to 20% by weight of the emulsifier-monomer premixture.

The seed-latex (containing free-radical catalyst) is added to a reaction vessel with from about 1 to 20 percent by weight of the emulsifier-monomer premixture. Subsequently, the polymerization is initiated at a temperature of about 30° C. to 45° C. After the reaction becomes exothermic, the remainder of the monomer premixture is added over a time sufficient to permit the temperature to be controlled throughout the reaction. Additional catalyst and/or promoter is added when necessary to maintain the reaction. When the latex reaches the desired solids level (50 percent to 70 percent), the reaction is permitted or forced to go to completion, which is ensured by raising the reaction temperature and/or by the addition of additional catalyst and/or promoter. The emulsion can then be post-stabilized, if desired, with additional emulsifier, as is conventional.

Unstabilized interpolymers of vinylidene chloride rapidly discolor upon exposure to actinic energy, as for example, within two days of exposure to sunlight falling on a southerly facing window sill. However, copolymers of this invention are far more stable, often by a factor of at least 7, usually by a factor of at least 10.5.

The mat of fibers may comprise an undirectional or isotropic web as made by carding or air deposition respectively. To provide additional cohesive strength, the web may be mechanically bonded, to produce entanglement of the fibers by needle or air jet punching; or heat bonded; or solvent bonded; as well as adhesively bonded with the vinylidene chloride interpolymer. Webs comprising spun-bonded fibers may also be utilized in preparing the non-woven fabrics of this invention.

The fibers may vary in length from about 0.25 to about 1.5 inches, e.g., about 1.0 inch. Suitable fibers include cellulosics, modacrylic, nylon, polyester, polypropylene, polyethylene, as well as the inorganic fibers such as glass, asbestos, etc. The inorganic fibers are especially preferred as they are fire-resistant. In the non-woven fabrics of this invention the fiber is most preferably glass, for its properties of fire-resistance and non-discoloration in the presence of heat and/or actinic radiation.

The fibers will be selected on the basis of the designated end-use of the non-woven fabric of this invention. For example, in furnace filters the fiber is preferably glass for its fire-resistance and stiffness, both of which are desirable in a furnace filter. Polyester fibers may be preferred in a fiber-fill application, while polypropylene may be preferred as a carpet backing.

The vinylidene chloride interpolymer may be applied to the mat of fibers as a latex, or a solution in a volatile organic solvent, or as a powder. It is preferred that the vinylidene chloride interpolymer be applied to the mat of fibers, as a latex by impregnation, printing or spraying. In the preferred latex application, the water is removed and the vinylidene chloride interpolymer is fused by heating to provide an adhesive bond at the points of fiber-fiber contact. The vinylidene chloride interpolymer latex utilized to prepare the non-woven fabrics of this invention may comprise from about 25 to about 55 percent interpolymer solids, preferably from about 35 to about 45 percent interpolymer solids, by weight. The vinylidene chloride interpolymer may comprise from 1 to 100 percent, preferably from 5 to 20 percent, by weight, of the non-woven fabrics of this invention, for adequate cohesive strength and fire-resistance.

Additional ingredients can be formulated into the latex to aid in processing and to vary the end-use properties of the non-woven fabric. For example, surfactants may be utilized to assist the latex in wetting and penetrating the mat of fibers. Thickeners may be utilized to increase the viscosity of the latex and thereby limit strike-through of the latex. Film-forming aids, including both volatile and non-volatile organic solvents, for the vinylidene chloride interpolymer may be incorporated into the latex. Defoamers are useful to assist in processing. Mildewcides and/or fungicides may provide stability toward degradation of the end product.

In particular, it may be desirable to increase the fire-resistance of the non-woven fabrics of the instant invention by incorporating fire-resistant pigments and salts and/or organic compounds having fire-resistant properties into the vinylidene-chloride interpolymer latex. Examples of such pigments include titania, silica, etc. A preferred pigment is antimony oxide which may impart synergistic fire-resistant properties to flammable materials when utilized in conjunction with the vinylidene chloride interpolymer. Many salts and organic compounds are known to impart fire-resistance to flammable materials. For example, phosphorus, in a salt or in an organic compound, is a well known fire retarding agent. Thus, ammonium, alkali metal, and alkaline earth metal phosphates and polyphosphates may be combined in the above latex. Organophosphorous esters are known plasticizers for many polymers and therefore may be utilized with such vinylidene chloride interpolymers to provide or increase fire-resistance, with the additional effect of plasticizing the vinylidene chloride interpolymer. Finally, halogen-containing salts and compounds are useful fire retardants; therefore, brominated organics and chlorinated waxes may be combined with the coatings for additional fire resistance.

The non-woven fabrics of this invention may be used as backings for reinforced plastics, wiping cloths, shoe innersoles, book bindings, battery separators, backings for vinyl fabric, furnace filters, rug backings, coated fabrics, automotive side-door paneling, backing for vinyl upholstery, heat-sealable battings, air filters, decorative ribbons and wrappings, electrical insulation, soundproofing, packaging, gaskets, cable wrappings, clothing, sheets, wall coverings, etc. In general, any end-use where a fire-resistant, light-stable textile structure is required or desired may take advantage of the non-woven fabrics of this invention.

In the following examples, methods for preparing compositions of the present invention and comparisons illustrating the stability thereof in the presence of light are presented. The examples, however, are not to be construed as limiting the scope of the invention, which is defined by the claims.

EXAMPLE I

In this Example, monomers of vinylidene chloride and methyl acrylate are copolymerized. The resultant interpolymer is then exposed to actinic energy so as to serve as a control for a series of experiments comparing the stability of interpolymers useful in this invention.

| | Grams |
|---|---|
| Emulsifier Premixture | |
| Water | 28 |
| Siponate DS-4 (a form of sodium dodecyl sulfate manufactured by Alcolac, Inc.) | 17.4 |
| Dupanol WAQE (a form of sodium lauryl sulfate manufactured by DuPont) | 2.4 |
| Dowfax 2Al (Diphenyloxide sulfonate manufactured by Dow Chemical Co.) | 1.54 |
| Monomer Premixture | |
| Vinylidene chloride | 167 |
| Methyl acrylate | 48 |
| Reactor Charge | |
| Monosodium phosphate | 2.3 |
| Disodium phosphate | 2.3 |
| Citric Acid | 0.4 |
| Seed latex | 10 |
| Promoter | |
| Erythorbic acid | 0.5 |
| Additional Catalyst | |
| 8.8% by weight hydrogen peroxide | 8.77 |

The emulsifier pre-mixture is prepared in a 500-ml, glass, triple-neck flask equipped with a motorized stirrer. The materials are stirred until entirely dissolved and brought to a temperature of 75° F. to 80° F. The monomer mixture is added to a glass flask and stirred for five minutes. The monomer pre-mixture and the emulsifier pre-mixture are admixed to form a pre-emulsion.

A 1-liter, triple-neck reactor vessel is charged with the above-described reactor charge. Fourteen milliliters of the pre-emulsion are added to the reactor vessel. After five minutes, the erythorbic acid is added to the reactor vessel. The erythorbic acid is added at a rate of one-half part per minute while the reaction mixture is stirred. After the temperature of the reaction mixture is adjusted to 113° C., an additional 60 grams of pre-emulsion are slowly added. Upon the addition of the remaining pre-emulsion, the temperature is adjusted to 122° C. The polymerization is completed by stirring the mixture at 122° C. for four hours.

The seed-latex is prepared as follows. A water-cooled reactor is charged with 0.2 parts of weight $NaH_2PO_4 \cdot H_2O$, 0.15 parts by weight of citric acid, 60 parts by weight of water, 4 parts by weight of a solution of 2% $H_2O_2$, and 300 parts by weight of an emulsifier composition composed of 56.0 parts by weight of an emulsifier composition composed of 56.0 parts by weight of sodium dodecylbenzene sulfonate (23% dry solids), 3.5 parts by weight disodium monodecylphenoxybenzene disulfonate (45% dry solids), and 15 parts by weight water. After the temperature is adjusted to 40° C., 281 parts by weight of an emulsifier monomer composition containing 180 parts by weight vinylidene chloride, 13 parts by weight acrylate, 2 parts by weight acrylic acid and 20 parts by weight of the above-described emulsifier is added to the reactor. The remaining 252 parts of the monomer composition are added to the reactor at a rate of about 3 parts by weight per minute. At the same time 6 parts by weight of ascorbic acid (1.1% by weight dry solids) is added over a period of 2 hours while the reactor is maintained at 40°-45° C. The batch is brought to a temperature of 27° C., and the remaining 30 parts of the above-described emulsifier composition are added.

A sample of polymerized product is spread on white paper and dried at 300° F. for 5 minutes. The sample is exposed to sunlight falling on a southerly facing window sill. Within 2 days of exposure to sunlight, severe discoloration is noted.

EXAMPLE II

In this Example, the procedure of Example I is repeated with the exception that the monomer premixture consists of 192 g vinylidene chloride, 36 g methyl acrylate, and 12 g acrylonitrile.

A sample of polymerized product is spread on white paper and dried at 330° F. for 5 minutes. The sample is exposed to sunlight falling on a southerly facing window sill. Discoloration is not noted after 2 weeks of exposure, so that the results indicate that a copolymer reaction mixture containing 80 percent total weight vinylidene chloride, 15 percent total weight methyl acrylate and 5 percent total weight acrylonitrile is more resistant to light-induced degradation than the control by a factor of at least 7.

EXAMPLE III

In this Example, the procedure of Example I is repeated with the exception that the monomer premixture consists of 167 g vinylidene chloride, 48 g methyl acrylate, and 24 g acrylonitrile.

A sample of polymerized product is spread on white paper and dried at 300° F. for 5 minutes. The sample is exposed to sunlight falling on a southerly facing window sill. Discoloration is not noted after 3 weeks of exposure, so that the results indicate that a copolymer derived from a reaction mixture containing 70 percent total weight vinylidene chloride, 20 percent total weight methyl acrylate, and 10 percent total weight acrylonitrile is more resistant to light-induced degradation than the control by a factor of at least 10.5

EXAMPLE IV

In this Example, the procedure of Example I is repeated with the exception that the monomer premixture consists of 180 g vinylidene chloride, 48 g butyl acrylate, and 12 g acrylonitrile.

A sample of polymerized product is spread on white paper and dried at 300° F. for 5 minutes. The sample is exposed to sunlight falling on a southerly facing window sill. Discoloration is not noted after 2 weeks of exposure. The results indicate that a copolymer derived from a reaction mixture containing 75 percent total weight vinylidene chloride, 20 percent butyl acrylate, and 5 percent acrylonitrile is more resistant to light-induced degradation than the control by a factor greater than 7.

EXAMPLE V

The vinylidene chloride interpolymers of Examples I through IV are utilized to provide cohesion to a web of glass fibers. The latices are sprayed on a web to provide a weight (upon drying at 200°-300° C.) of 5 to 20 grams of vinylidene chloride interpolymer per 100 grams of glass fibers. A lit match held to any of the thus prepared textile structures does not ignite the textile structure. The textile structures are exposed to sunlight as described above and those including the acrylonitrile-containing interpolymer show substantially less discoloration.

While particular embodiments of the invention have been described, it will be understood, of course, that the invention is not limited thereto since many obvious modifications can be made, and it is intended to include within this invention any such modifications as will fall within the scope of the appended claims.

Having now described the invention, I claim:

1. A fire-resistant, light-stable textile structure comprising a mat of fibers held together with a vinylidene chloride interpolymer containing a light-stabilizing amount of a nitrile-containing comonomer in interpolymerized form.

2. The structure of claim 1 wherein said nitrile-containing comonomer is selected from the group consisting of compounds represented by the general formula:

wherein $R_3$ is an organic radical containing an alpha unsaturated alkyl group having from 2 to about 20 carbon atoms.

3. The structure of claim 2 wherein $R_3$ is selected from the group consisting of alkyl radicals and radicals represented by the general formula

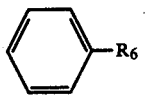

wherein $R_6$ is an alkyl radical having from 2 to about 14 carbon atoms and the nitrile group is substituted on the benzene ring.

4. The structure of claim 3 wherein $R_3$ is selected from the group consisting of radicals represented by the general formula:

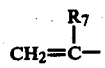

wherein $R_7$ is hydrogen or a lower alkyl radical containing up to 4 carbon atoms.

5. The structure of claim 1 wherein said nitrile-containing radical is acrylonitrile.

6. A fire-resistant, light-stable textile structure comprising a mat of fibers held together with a vinylidene chloride interpolymer which comprises, on a comonomer weight basis:

(a) from about 50 to about 90 percent vinylidene chloride;

(b) from about 5 to about 30 percent of a plasticizing comonomer for vinylidene chloride selected from the group consisting of butadiene, maleic anhydride, and compounds represented by the general formulae:

wherein $R_1$ is an organic radical containing an alpha unsaturated alkyl group having from 2 to about 30 carbon atoms, $R_2$ is hydrogen or an alkyl, alkoxyalkyl, hydroxy-alkyl, or aminoalkyl radical having from 1 to about 20 carbon atoms, and X is a phenyl group, acetate group, ethoxy group, a halide or hydrogen; and (c) from about 3 to about 15 percent of a nitrile-containing comonomer selected from the group consisting of compounds represented by the general formula:

wherein $R_3$ is an organic radical containing an alpha unsaturated alkyl group having from 2 to about 20 carbon atoms.

7. The structure of claim 6 wherein said plasticizing comonomer is selected from the group consisting of chloride, vinyl acetate, ethylene, butadiene, ethyl vinyl, styrene, vinyl ether, maleic anhydride, and compounds having the structural formula:

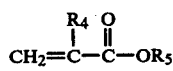

wherein $R_4$ is hydrogen, or a lower alkyl group having up to 4 carbon atoms, and $R_5$ is hydrogen, an alkyl, alkoxyalkyl, hydroxyalkyl, or aminoalkyl radical having from 1 to 20 carbon atoms.

8. The structure of claim 7 wherein $R_4$ is a methyl or butyl group.

9. The structure of claim 8 wherein said plasticizing comonomer is selected from the lower alkyl esters of acrylic acid and methacrylic acid.

10. The structure of claim 9 wherein said plasticizing monomer is selected from the group consisting of methylacrylate and butylacrylate.

11. The structure of claim 6 wherein said nitrile-containing comonomer is selected from the group consisting of compounds represented by the general formula:

wherein $R_3$ is an organic radical containing an alpha unsaturated alkyl group having from 2 to about 20 carbon atoms.

12. The structure of claim 11 wherein $R_3$ is selected from the group consisting of alkyl radicals and radicals represented by the general formula:

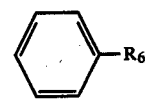

wherein $R_6$ is an alkyl radical having from 2 to about 14 carbon atoms and the nitrile group is substituted on the benzene ring.

13. The structure of claim 12 wherein $R_3$ is selected from the group consisting of radicals represented by the general formula:

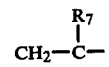

wherein $R_7$ is hydrogen or a lower alkyl radical containing up to 4 carbon atoms.

14. The structure of claim 11 wherein said nitrile-containing radical is acrylonitrile.

15. The structure of claim 11 wherein said fibres are selected from the group consisting of cellulosics, modacrylic, nylon, polyester, polypropylene, glass and asbestos.

16. The structure of claim 15 wherein said fibers vary in length from 0.25 to 1.5 inches.

17. The structure of claim 16 wherein said fibers are glass.

18. A fire-resistant, light-stable textile structure comprising a mat of fibers held together with a vinylidene chloride interpolymer which comprises, on a comonomer weight basis:
   (a) from about 70 to about 80 percent vinylidene chloride;
   (b) from about 10 to about 20 percent of a plasticizing comonomer selected from the group consisting of the lower alkyl esters of acrylic acid and methacrylic acid; and
   (c) from about 5 to about 10 percent acrylonitrile.

19. The structure of claim 11 wherein said fibres are selected from the group consisting of cellulosics, modacrylic, nylon, polyester, polypropylene, glass and asbestos.

20. The structure of claim 15 wherein said fibers vary in length from 0.25 to 1.5 inches.

21. A furnace filter comprising a mat of glass fibers held together with a fire-resistant, light-stable vinylidene chloride interpolymer containing a light-stabilizing amount of a nitrile-containing comonomer in interpolymerized form.

22. The structure of claims 1, 6 or 18 wherein said fibers are selected from the group consisting of inorganic fibers.

23. The structure of claims 1, 6 or 18 wherein said fibers are selected from the group consisting of glass fibers.

* * * * *